United States Patent [19]

Giuliani et al.

[11] Patent Number: 4,756,821
[45] Date of Patent: Jul. 12, 1988

[54] METHOD FOR THE LIQUID PHASE HYDROTREATMENT OF HEAVY HYDROCARBONS IN THE PRESENCE OF A DISPERSED CATALYST

[75] Inventors: Pierre Giuliani, Grenoble; Sigismond Franckowiak, Rueil Malmaison; Gilbert Roche, La Barrière; Pierre Bergez, Paris, all of France

[73] Assignees: Institut Francais du Petrol, Rueil-Malmaison; Commissariat a l'Energie Atomique, Paris, both of France

[21] Appl. No.: 13,083

[22] Filed: Feb. 10, 1987

[30] Foreign Application Priority Data

Feb. 10, 1986 [FR] France ............................. 86 01879

[51] Int. Cl.⁴ ..................... C10G 49/12; C10G 49/22; C10G 45/16
[52] U.S. Cl. .................................. 208/102; 208/186; 208/308
[58] Field of Search ............... 208/102, 177, 216, 186, 208/308, DIG. 2, 100, 152, 99

[56] References Cited

U.S. PATENT DOCUMENTS

| | | | |
|---|---|---|---|
| 3,622,498 | 11/1971 | Stocfa et al. | 208/102 |
| 4,060,488 | 11/1977 | Hoover et al. | 210/433 |
| 4,411,790 | 10/1983 | Arod et al. | 210/637 |

FOREIGN PATENT DOCUMENTS 523201  3/1956  Canada .............................. 208/102

Primary Examiner—Patrick P. Garvin
Assistant Examiner—George R. Fourson
Attorney, Agent, or Firm—Millen & White

[57] ABSTRACT

A hydrotreatment method, for example, hydroviscoreduction or hydrodesulfurization in which the charge of hydrocarbons is reacted with hydrogen in contact with a catalyst finely dispersed in the liquid phase. To separate the product from the catalyst, the effluent freed from its accompanying free gas is passed along, and in contact with the upstream wall of a porous inorganic membrane. The oil that has not been filtered contains a concentrate of catalyst and is recycled to the hydrotreatment reactor. The filtered oil constitutes the product of the method.

9 Claims, 1 Drawing Sheet

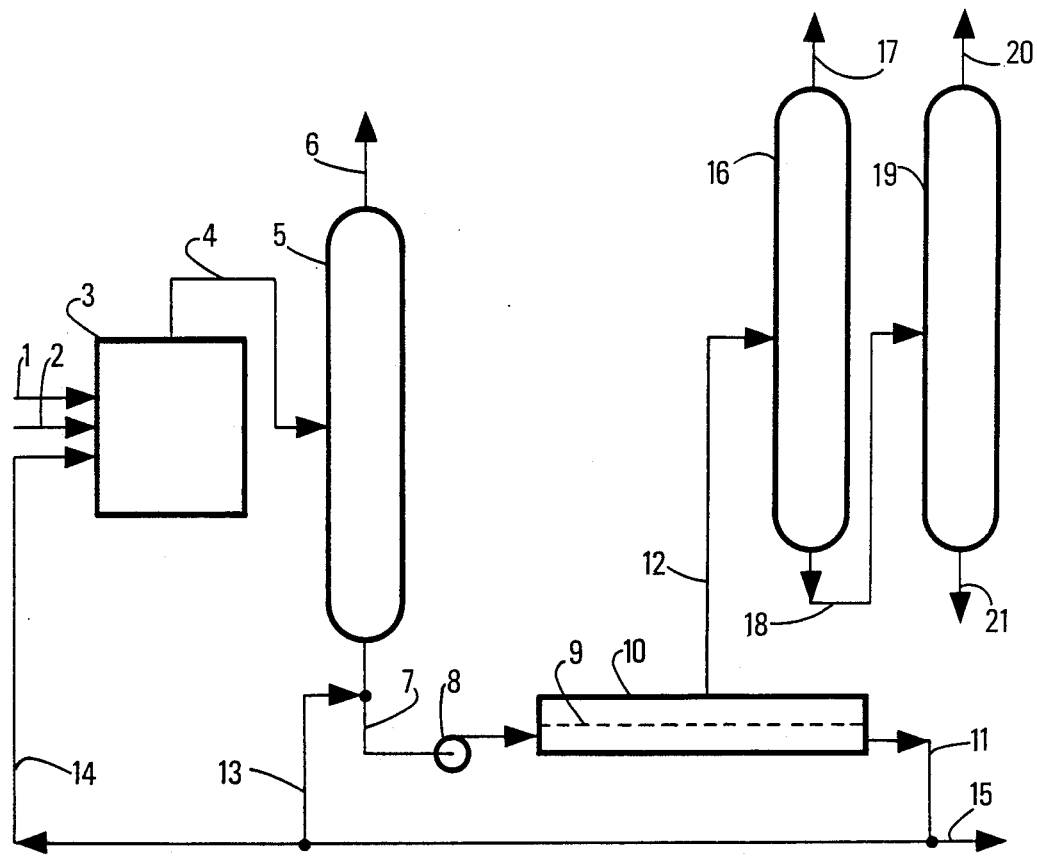

METHOD FOR THE LIQUID PHASE HYDROTREATMENT OF HEAVY HYDROCARBONS IN THE PRESENCE OF A DISPERSED CATALYST

BACKGROUND OF THE INVENTION

This invention relates to the field of petroleum refining and more specifically to methods for the conversion of petroleum crudes, heavy hydrocarbon fractions, as well as petroleum residues by hydrogenation.

The charge used in the method of this invention can be any hydrocarbon oil of a high boiling point, for example, above 350° C. The initial source of the oil can be, for example any petroleum crude, materials such as shale oils or oily sands, or liquid hydrocarbons resulting from coal liquefaction. The charge usually contains at least 1% asphaltenes, determined by precipitation with heptane.

Petroleum and petroleum fractions are very complex mixtures in which, besides hydrocarbons, there are various compounds containing principally sulfur, nitrogen, oxygen, as well as metals. The quantity and nature of these compounds vary according to the source of the crude from which they are derived and the fractions concerned. They are generally impurities detrimental to the good quality of petroleum products on account of contamination, corrosion, odor, instability. Of the numerous methods recommended for their removal, catalytic treatments in the presence of hydrogen are the most widespread.

This technique has the advantage of allowing products of good quality to be obtained from petroleum crudes and residues with a high content of impurities.

The difficulties in treating these charges are related principally to the presence of asphaltenes and metals which, under insufficiently controlled conditions, cause the deactivation of catalysts.

The contaminating Metal agents can be present as oxides or sulfides; usually, however, they are in the form of organo-metal compounds such as porphyrins and their derivatives. The most common metals are vanadium and nickel.

Asphaltenes occur in the form of a colloidal suspension which under hydrogenation refining conditions may agglomerate and become deposited on the catalytic composition; thus fixed-bed hydrotreatment of these charges does not give satisfactory results, the catalyst becoming deactivated following the deposition of coke and metals.

The boiling-bed technique, applied to heavy charges (FR Nos. 2,396,065 and 2,396,066), enables the consumption of catalyst to be reduced 1.5 times compared with the prior fixed-bed methods and the production of liquid products to be increased 2.5 times compared with other methods which involve prior deasphalting of the initial charge. This type of process converts the soluble organo-metal compounds well, but is less efficient as regards the asphaltenes. In addition, there is a certain erosion of plant and catalyst. One difficulty is the filtration of the product to separate from it the fine solid particles in suspension.

Another technique mitigating these disadvantages, as it gives the high molecular weight asphaltenes better accessibility to the catalytic sites, is disclosed in numerous patents such as FR No. 1,373,253 and U.S. Pat. No. 3,165,463.

With this objective in mind, catalytically active metal compounds are used in divided form. These are compounds of metals selected from groups IV, V, VI and/or the iron group, in suspension or in solution. During the hydrorefining treatment, they undergo several conversions and are finally present in finely divided dispersed form or as sludge, usually as sulfides.

This technique can have various names, such as hydrogenation, hydrotreatment, hydrorefining or hydroviscoreduction.

The technique requires that the heavy hydrocarbons and the catalyst sludge be separated from the total product leaving the reaction zone. This operation has so far been carried out by means such as centrifuging, filtration, distillation, followed by separation of the sludge containing the catalyst; the total or partial recycling of the latter has also been suggested for treating a fresh charge of hydrocarbons.

This sludge also contains, besides the metal used as catalytically active material, variable quantities of nickel, vanadium or other metals derived from the destructive conversion of asphaltenes. Before recycling, part of this sludge can be drawn off as a catalyst purge and replaced by a substantially equivalent quantity of fresh catalyst compound.

The principal difficulty in the techniques described above resides in the separation of the catalyst from the reaction product. Certain methods, in particular distillations, are costly in energy and require relatively high temperatures which the catalyst does not tolerate in the absence of hydrogen; other methods require major cooling of the effluent, which is not very advantageous since it then has to be reheated and part of it returned to the reactor; finally, other methods, such as filtration, result in a relatively rapid clogging of the filters.

U.S. Pat. No. 4,411,790 describes a tangential ultrafiltration method applied to spent lubricating oils or petroleum distillation residues, but this gives relatively unsatisfactory results as regards the filtration of the asphaltenes and the vanadium, since a large part of these passes through the inorganic membranes. In addition, the membranes clog relatively rapidly, in particular when the charge contains more than 8% by weight of asphaltenes (heptane test).

SUMMARY OF THE INVENTION

The object of this invention is to describe a method for the hydrotreatment of heavy hydrocarbon fractions containing asphaltenes, which overcomes at least part of the disadvantages cited above, and in which an oil with a highly reduced content of asphaltenes is obtained, without having recourse to costly products fractionation systems, even when the asphaltenes content of the charge is high, for example, equal to or greater than 8% (heptane test).

The hydrotreatment is carried out at 360°–500° C. and 50–300 bars in a hydrogen atmosphere.

The method uses a catalyst which, because of the fineness of its particles, is dispersed in the liquid phase and must be separated from it. This fineness usually results from the fact that the catalyst is introduced in the form of compounds soluble or dispersable in the oil, and which then undergo various conversions, notably, sulfurization.

According to the invention, a hydrocarbon catalytic hydrotreatment unit effluent, consisting of a mixed free gas-liquid phase containing dispersed catalyst and dissolved gas is first subjected to a gas-liquid fractionation enabling said free gas phase, rich in hydrogen, to be separated from said liquid phase. The hydrocarbon liquid phase obtained, which contains the dispersed catalyst, is subjected to treatment by being circulated along a porous inorganic membrane (tangential filtration), thus in a zone upstream of a membrane, at a temperature sufficient for the liquid phase to be sufficiently fluid, for example, a temperature of at least 100° C. At the outlet of this upstream zone, a catalyst-enriched hydrocarbon fraction is collected and at least part of it is returned to the hydrotreatment zone. The oil, with a reduced content of catalyst and asphaltenes, is collected on the downstream side.

According to a first preferred embodiment of the invention, the hydrotreatment liquid product, free of gas phase but still containing at least part of the light reaction products in a dissolved state, is subjected to tangential filtration. The reaction product can therefore be subjected to one or several reductions in pressure, but it is preferable not to lower its pressure to below 10 bars absolute in order to retain a sufficient quantity of light components in the dissolved state, these components being particularly hydrogen and light hydrocarbons. Thus it has been found that if the oil is brought back to atmospheric pressure and practically totally de-gassed before filtration, the filtration rate is considerably reduced, all else being equal.

However, it is not necessary for the oil to be filtered in a totally gas-saturated state; and preference is even given to operating in an under-saturated state, as indicated below.

According to a second preferred embodiment of the invention, the liquid hydrocarbon fraction containing the dispersed catalyst and gas dissolved in a near-saturation quantity derived from the gas-liquid fractionation mentioned above, is subjected to treatment aimed at reducing the dissolved gas content to definitely below the gas saturation level under the prevailing conditions, and then circulating it along the upstream face of a porous inorganic membrane, the temperature and pressure conditions during this passage in the upstream zone being such that said liquid hydrocarbons fraction remains constantly below the gas saturation level (that is, no de-gassing is observed on the upstream side, despite the pressure drop resulting from such circulation). On leaving the upstream zone, a catalyst-enriched hydrocarbons fraction which has not passed through the membrane is collected and returned, at least partly to the hydrotreatment unit. Part of it can be purged. By gas is understood not only hydrogen but also all the light hydrocarbons, hydrogen sulfide and more generally all the gases and vapors present.

On the downstream side of the membrane, where the pressure is lower than upstream, an oil fraction, or a mixed oil/gas fraction, depending on the pressure (with a greatly reduced catalyst and asphaltenes content) is collected.

To bring the liquid hydrocarbons fraction containing dissolved gas in a quantity equal to (or close to) saturation to a state in which the quantity of dissolved gas is less than that required for saturation, the pressure exerted on this fraction is advantageously increased in the absence of free gas (otherwise, the additional gas would dissolve), for example, by a circulating pump.

The increase in pressure to be exerted must therefore be at least equal to the drop in pressure (also called pressure drop) which said liquid fraction inevitably undergoes when it circulates in the zone upstream of the membrane in contact with it. This drop in pressure depends on several factors, in particular the cross-section of the passage, length of path to be travelled and the viscosity of the liquid. It is generally, between 0.1 and 10 bars, usually 0.2 to 3 bars. It is therefore at least from this value that the pressure of the liquid fraction must be raised. There is no upper limit.

According to a particular mode of embodiment of the invention, if several distinct filtration cells are used, either the pressure can be raised by at least the sum of the successive individual drops in pressure on the upstream side, or else the pressure between each cell can be raised by at least the pressure drop upstream of each cell.

According to a particular mode of embodiment of the invention, the pressure of the hydrocarbon fraction to be filtered is raised by at least the sum $\Delta P_1 + \Delta P_2$, where $\Delta P_1$ is the drop in pressure due to the flow between the upstream inlet and the upstream outlet and $\Delta P_2$ is the drop in pressure between the upstream face outlet and the downstream face of the membrane.

Subject to these reservations, the filtration can be carried out at any temperature, for example, 125°–500° C., and at any pressure (upstream side) provided that there is a sufficient pressure differential for filtration to take place. It can be advantageous to operate in temperature and pressure ranges close to those of the hydrotreatment reaction, that is, 360° –500° C. and 50–300 bars, which simplifies the utilization of the method.

The membrane can be any of those described in the prior art, for example, according to U.S. Pat. Nos. 4,060,488, 4,411,790 or FR Nos. 2,257,092 or 2,550,953. In particular, according to these patents, the membrane can include a metal, ceramic, carbon or equivalent substrate on to which has been deposited a fine material consisting of at least one metal compound, for example one of the oxides of the following elements: titanium, zirconium, silicon, magnesium, aluminum, yttrium, hafnium, mixed oxides of several of these metals, with or without silica, or boron oxide or a fluoride of an alkali or alkaline-earth metal, silicon carbide, silicon nitride, etc. The radius of the pores of the inorganic membrane can be chosen to be, for example, between $20 \times 10^{-10}$ m and $2000 \times 10^{-10}$ m.

The optimum pore radius to obtain both a high and stable filtration rate and a high solids discharge rate depends on the catalyst system used. For example, with catalyst systems based on organic solvent soluble precursors (molybdenum naphthenate, for example) the optimum lies between 150 and $400 \times 10^{-10}$ m, whereas with systems based on precursors in powder form (for example, iron oxides, iron sulfate, red sludge), the optimum lies rather between 300 and $1000 \times 10^{-10}$ m. Preferably, a maximum pore radius is used, but one nevertheless smaller than the radius of the finest particles so as not to have any clogging.

The hydrotreatment (or hydroviscoreduction or hydrogenation, etc.) reaction catalyst is introduced in the form of a compound of any of the metals of groups V to VIII of the Periodic Table, or a mixture of these compounds. Representative metals are vanadium, tungsten, molybdenum, cobalt, nickel and/or iron. These compounds can be introduced as such or in the form of a solution or suspension in any liquid that does not interfere with the reaction. The prior art includes many suggestions in this connection.

The quantity of fresh catalyst depends on the latter's activity, for example, 20 ppm (weight) to 5% (weight)

or more, with respect to the fresh charge of hydrocarbons.

Because of the recycling of the catalyst from the outlet upstream of the filtration zone to the reaction zone, the catalyst concentration in the reaction zone can be between about 500 ppm and 20% by weight with respect to the hydrocarbons.

The circulation rate in the compartment upstream of the membrane is preferably adjusted to the concentration of solids in the suspension treated, advantageously to within the 0.5-11 m/s range.

BRIEF DESCRIPTION OF THE DRAWINGS

Various other objects, features and attendant advantages of the present invention will be more fully appreciated as the same becomes better understood when considered in conjunction with the accompanying drawing, in which like reference characters designate the same or similar parts throughout the view, and wherein:

The figure appended illustrates one mode of embodiment of the invention (the quantified data are given as an example).

The hydrocarbons charge (1), with addition of finely dispersed catalyst and hydrogen (2), enter the reactor (3). The temperature is 480° C. and the pressure 150 bars. The effluent passes via pipe (4) into separator (5), the gaseous hydrogen (6) separates from the liquid phase containing the catalyst (7). This liquid phase is saturated with hydrogen.

Pump (8) raises the pressure by 5 bars absolute (total pressure = 155 bars). The liquid phase and the dispersed catalyst travel along the inorganic filtration membrane (9) of filtration unit (10) on the upstream side. They leave it via pipe (11) at a pressure one bar lower than they had at the inlet (the loss of charge is therefore one bar. They are returned via pipes (11) and (14) to reactor (3), after passing through a pre-heater (not shown). A part of these passes to pump 8. Another part is purged via line (15). The filtrate (downstream side) can be drawn off the line (12). The filtrate can be treated with a view to fractionating its products. It is subjected to reduced pressure, for example, down to 5 bars, and then passed into separator (16). At the head, a gas (17) separates and at the base a liquid phase (18), which is fractionated in column (19). At the head (20), a distillate (light + middle distillate) is collected and at the base (21) the hydrocarbon product of the method.

Unit (10) can comprise several individual units combined in series and/or parallel.

According to a variant, unit (10) can be installed only after passage to 2 (or more) separators, such as (5), each operating at increasingly lower pressures without, however, descending to below 10 bars absolute. This makes it possible to remove from the circuit not only the gaseous hydrogen but also the other initially dissolved gases, such as $H_2S$, $CH_4$, $C_2H_6$, etc. However, it is preferable to raise pressure at the outlet of the separator preceding the inorganic membrane filtration unit.

Although filtration can be continued for a long time, it is advantageous to clean the membrane periodically by applying a back pressure, for example, of 1 to 30 bars, on its downstream side. Membranes such as those of U.S. Pat. No. 4,411,790 or FR No. 2,550,953 enable such back pressure to be applied and are therefore preferred.

EXAMPLE 1

A battery of filtration cells was used. The filter layer was of the zirconium oxide type with a pore radius of $150 \times 10^{-10}$ meter. The substrate was sintered nickel.

The charge was a heavy Arabian crude to which were added 70 ppm by weight of molybdenum and 20 ppm by weight of cobalt in the form of naphthenates, as well as a recycling current (the concentrate as defined below) containing metals principally as sulfides in the form of dispersion.

The above mixture, with addition of hydrogen in excess with respect to saturation, was maintained at 430° C. under a pressure of 150 bars with a residence time of 3 hours. The concentration of insolubles was 15 g/l, including 6% metals.

The effluent, having the above composition was passed to 2 successive separators, the first at 150 bars and 380° C., the second at 20 bars and 250° C., and the gases liberated discharged. The residual liquid phase at 20 bars and 250° C. was recovered by a circulating pump which raised its pressure to 28 bars, and then circulated it at 4 meters/s on the upstream side of the zirconium oxide membrane at 250° C., 28 bars at the upstream inlet, 26 bars at the upstream outlet. The pressure downstream of the membrane was 22 bars.

The concentrate (fraction not having passed through the membrane) was recycled; nevertheless a fraction of it was purged to maintain a constant concentration of catalyst in the reactor. No degassing was observed.

The filtrate, freed of 97.3% of the insolubles, had the composition shown in Table I, which also gives the composition of a fresh charge + fresh catalyst mixture.

TABLE I

|  | Fresh charge + fresh catalyst of example 1 | Filtrate of example 1 |
| --- | --- | --- |
| Asphaltenes (C7) % | 13 | 1.8 |
| NI ppm | 46 | 10 |
| V ppm | 264 | 26 |
| Mo ppm | 70 | 0.5 |
| Co ppm | 20 | 0.5 |

The filtration results are given in Table II.

The filtration results are given in Table II.

Chromatography showed a certain enrichment of the filtrate with light hydrocarbons (gasoline and middle distillates) with respect to the filtration charge, which is particularly advantageous since it is heaviest fractions together with the catalyst that are recycled to the reactor. This part of the heavy fractions, those that require the greatest conversion, can be recycled selectively.

EXAMPLE 2

Example 1 was repeated, except that the separator was adjusted to 28 bars and the pressure of the liquid phase leaving the separator was not raised. The operation was therefore carried out with the liquid phase saturated with dissolved gas.

As in example 1, the pressure on the upstream side, was 28 bars at the inlet and 26 bars at the outlet, and 22 bars on the downstream side. The filtration results are given in table II. The composition of the product is substantially the same as that of example 1.

It was found that, compared with example 1, the flowrate was both lower and less stable over time. It was also observed that there was major degassing from the two effluents (upstream and downstream) from the membrane.

TABLE II

| EXAMPLE | Filtration flow rate m³/day.m² | | Discharge rate (*) after 50 h R |
|---|---|---|---|
| | after 1 h | after 50 h | |
| 1 | 5 | 5 | 97.3% |
| 2 | 1.9 | 1.5 | 96.8% |

(*) $R = 1 - \frac{C_p}{C_o}$ where $C_p$ = concentration of insolubles in permeate; $c_o$ = concentration of insolubles in the charge.

EXAMPLE 3

Example 1 was repeated with a membrane of the same nature, but with pores of a mean radius of $3000 \times 10^{-10}$ m. The filtration flowrate was 9 m³/day.m² after 5 h and 8.8 m³/day.m² after 50 h. The discharge rate after 50 h was 96%. There was no degassing.

EXAMPLE 4

The membrane was of alumina with a pore radius of $500 \times 10^{-10}$ m. The charge was a Safaniya residue to which 0.5% by weight of red mud as well as a recycling stream were added so as to maintain a constant concentration of 3% by weight of solids in the reactor. The operation was carried out at 480° C. and 220 bars with an excess of hydrogen with respect to saturation. The residence time was 4 hours.

The product was then passed to 2 separators, the second of which, at 50 bars and 330° C. fed, via a pump, the filtration unit operating under pressure of 64 bars (upstream inlet), 61 bars (upstream outlet) and 52 bars (downstream side).

No degassing was observed.

A filtration rate of 15m³/d.m² was noted, and this rate remained constant for the 50 h of the experiment.

The filtrate was then treated conventionally, that is it was degassed at a pressure of 5 bars and then topped at atmospheric pressure at 330° C. It consisted of a heavy fuel oil complying with ASTM standards.

COMPARATIVE EXAMPLE

Example 4 was repeated up to the passage to the two separators included. From there the product passed directly to a third gas separator under pressure of 1 bar at 330° C. The liquid phase was therefore substantially free of dissolved light fractions. The pressure was raised from 1 bar to 17 bars at 330° C. and the filtration carried out at 17 bars, at the upstream inlet, and at 14 bars at the upstream outlet, and 5 bars at the downstream outlet, thus, with the same pressure differences as those in example 4.

In this case the filtration rate was only 3 m³/d.m².

This demonstrates the advantage of carrying out the filtration of a hydrotreatment effluent whose pressure was not lowered to below 10 bars.

What is claimed is:

1. A method for the liquid phase hydrotreatment of a charge of liquid hydrocarbons, comprising reacting said charge with hydrogen and a dispersed hydrotreatment catalyst at 360°–500° C. and 50–300 bars in a reaction zone, fractionating the resulting effluent from said reaction zone and separately recovering a free gas phase and a liquid phase saturated with dissolved gas and containing dispersed catalyst, discharging said free gas phase, increasing the value of the pressure on said separate liquid phase to a sufficient value to bring said liquid phase to a state of gas sub-saturation, circulating said liquid phase in state of gas sub-saturation along the upstream face of a porous inorganic membrane at a temperature of at least 100° C. in a filtration zone, said membrane having pores of 2 to 200 nm, recovering a liquid filtrate and a catalyst-enriched liquid phase which has not filtered through the membrane, returning at least a portion of said catalyst-enriched liquid phase to the reaction zone, and degassing said liquid filtrate by pressure release to recover a degassed hydrotreated liquid hydrocarbon product.

2. The method according to claim 1, wherein the filtration is carried out at a pressure of at least 10 bars absolute on the upstream side of the membrane, and wherein the liquid phase circulated in the filtration zone has not been de-gassed or has been degassed at a pressure of greater than 10 bars before said filtration.

3. The method according to claim 1, wherein the value of the pressure increase on the liquid phase is at least equal to the drop in pressure undergone by the liquid phase circulated along the upstream face of the membrane.

4. The method according to claim 3, wherein said pressure increase is 0.1 to 10 bars.

5. The method according to claim 3, wherein the pressure increase is at least the sum of $\Delta P_1 + \Delta P_2$ wherein $\Delta P_1$ is the drop in pressure undergone by the liquid phase circulated along the upstream face of the membrane and $\Delta P_2$ is the drop in pressure between the outlet of the upstream face and the downstream face of the membrane.

6. The method according to claim 1, wherein the catalyst comprises at least one compound of a metal chosen from groups V to VIII of the periodic table, and in which the total concentration of fresh catalyst and recycled catalyst is 500 ppm to 20% by weight.

7. The method according to claim 6, wherein the catalyst metal is chosen from the group consisting of molybdenum, cobalt, and mixtures thereof.

8. The method according to claim 1, wherein the porous inorganic membrane contains at least one oxide of an element chosen from the group consisting of titanium, zirconium, silicon, magnesium, aluminum, yttrium, hafnium, mixed oxides thereof, at least one fluoride of an alkali or alkaline-earth metal, and a carbide or nitride of silicon.

9. The method according to claim 1, wherein the charge of hydrocarbons contains at least 8% by weight of asphaltenes as determined by the heptane test.

* * * * *